Figure 1:
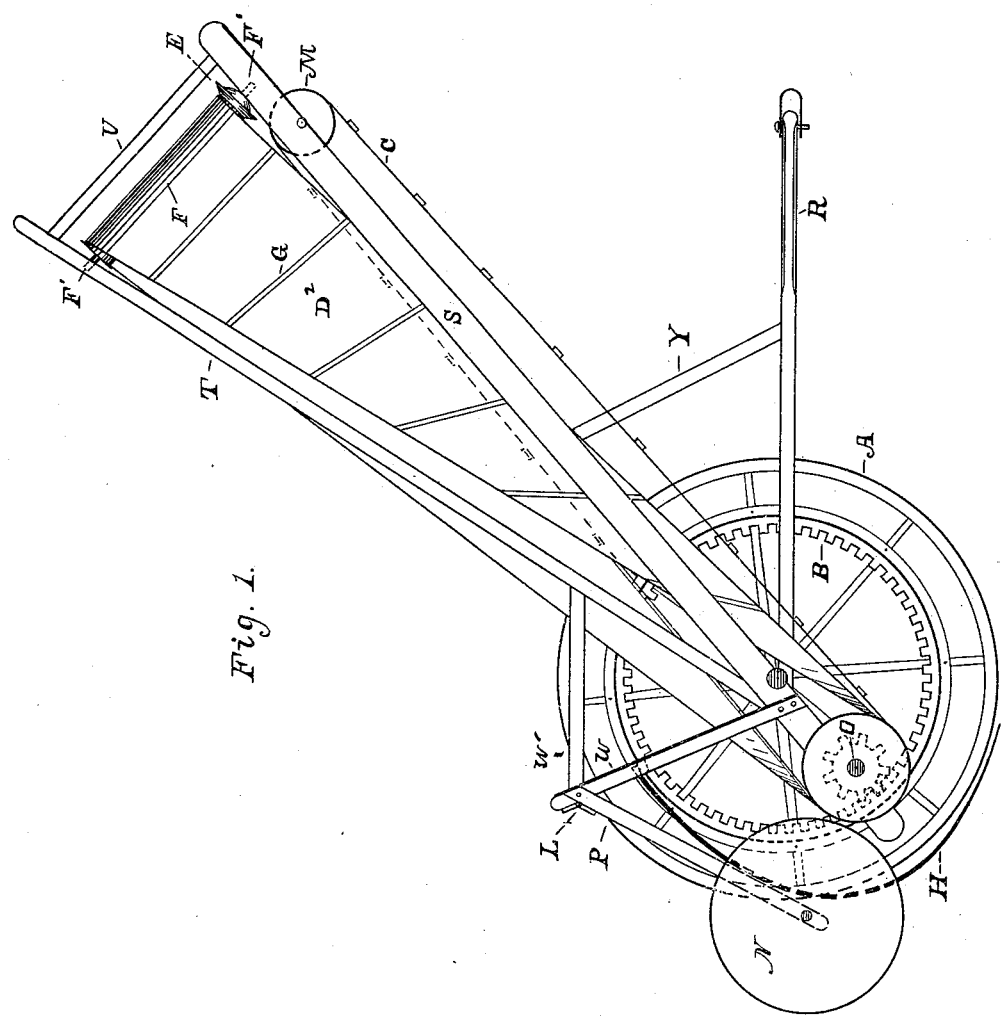

(No Model.) 2 Sheets—Sheet 1.

D. B. TANGER.
HAY LOADER.

No. 329,687. Patented Nov. 3, 1885.

E. K. Campbell
M. A. Christie

David B. Tanger,
per C. D. Campbell

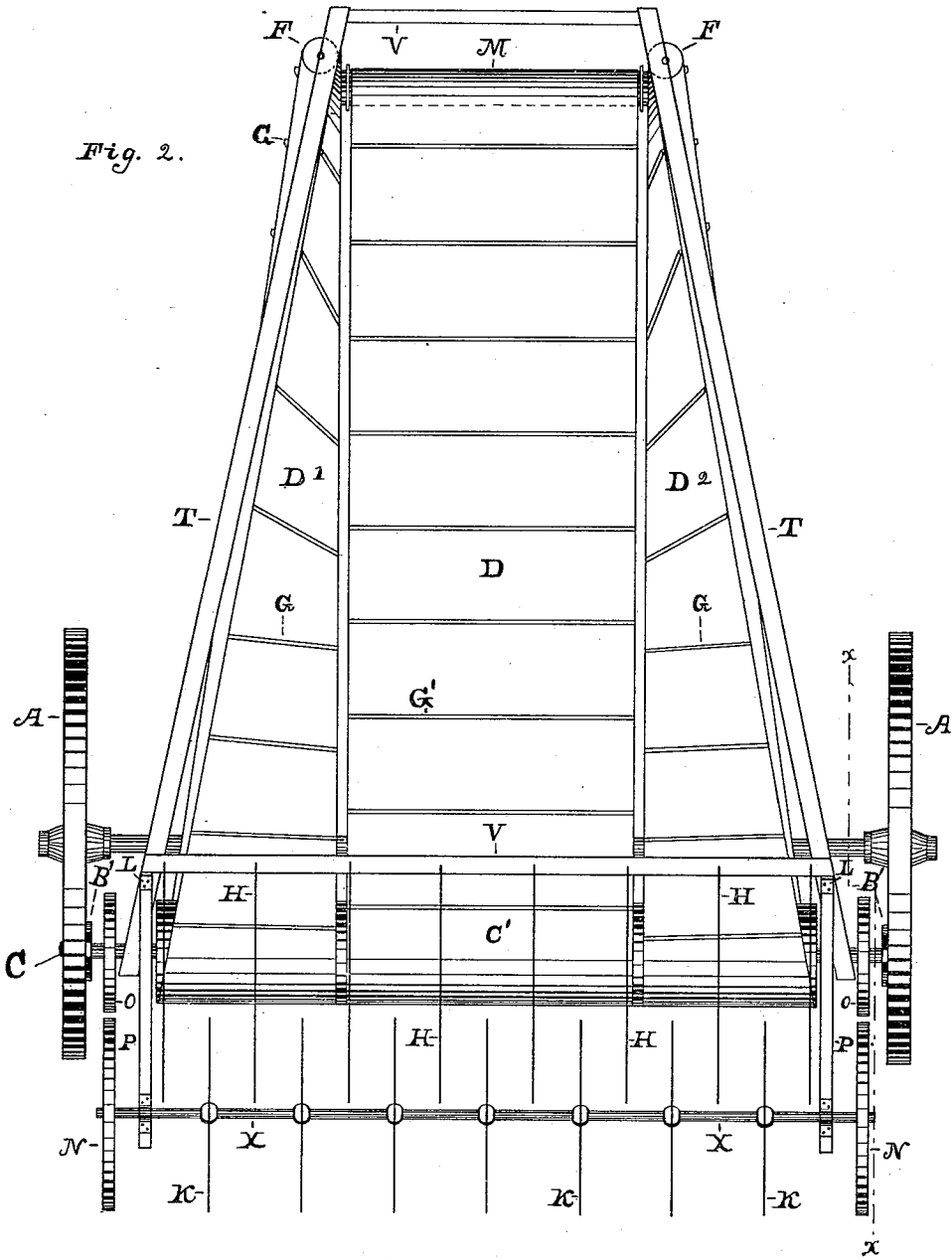

UNITED STATES PATENT OFFICE.

DAVID B. TANGER, OF NEAR BELLEFONTAINE, OHIO.

HAY-LOADER.

SPECIFICATION forming part of Letters Patent No. 329,687, dated November 3, 1885.

Application filed January 3, 1885. Serial No. 151,902. (No model.)

*To all whom it may concern:*

Be it known that I, DAVID B. TANGER, a citizen of the United States, and a resident of near Bellefontaine, in the county of Logan and State of Ohio, have invented a new and useful Hay Raker and Loader, of which the following is a specification.

My invention is an improvement in that class of hay rakes and loaders that are attached to the rear of an ordinary hay wagon or "ladder" by means of a tongue or reach, and which deliver the hay upon the wagon by means of a traveling apron; and the invention consists, essentially, in arranging the rake and elevator so as to take up hay for a width double the width of the wagon by means of the usual flat elevating-apron and two side aprons parallel with the middle apron at the starting-point, but having a quarter-twist given them to condense the hay onto the middle apron before delivering it onto the wagon; also, in continuous feed-disks to help feed the hay onto the aprons; also, in the shape of my elevating-frame, which, when the aprons are on, forms a condensing-frame and wind-break.

Figure 1 is a side view of my device, partly in section, on the line $x\ x$, Fig. 2. Fig. 2 is a top view.

A A are the main wheels, on which the loader and rake run.

B B are internal cog-circles on wheels A.

B' B' are spur-wheels on shaft C of drum C'.

D D' D² are three belts or aprons running side by side over drum C' for elevating the hay.

D is the usual flat traveling apron, that projects at its upper end immediately over the wagon.

D' D² are flat belts at the sides of D, to which are given a quarter-twist after receiving the hay, by means of the vertical rollers F F, to deliver it onto the middle belt, D.

E is a collar on the lower end of a roller, F, to prevent the apron from slipping off. There is one such collar on each roller.

F F are vertical rollers journaled at F' F', around which the side belts are carried to give them the quarter-twist necessary to carry or condense the hay onto the middle belt.

G G are spring-ribs on the side belts, that keep the side belts spread to their full width, and yet allow them to assume all the positions necessary in making their quarter-twists around the rollers F.

G' G' are ribs on apron D.

H H are a set of ordinary spring rake-teeth attached to the frame in any manner convenient, so that they may be raised and lowered at will.

K K are a set of sheet-metal or wooden disks mounted on the shaft X, that is swung from standards W by the pivoted or hinged pieces P in such manner that they fall between the rake-teeth and bear against the hay.

L L are the points at which the arms P are hinged.

N are two friction-rolls on shaft X, that bear against friction-rolls on shaft C and keep the disks off the belts when no hay is passing.

M is a roller on the upper end of the frame, over which the belt D passes.

O O are friction-rolls on axis C.

R is the tongue.

S S are the main pieces of the elevator-frame.

T T are pieces diverging from them, in which and pieces S rollers F are journaled.

U are connecting-pieces.

V is a cross-piece between pieces S.

W is one of two standards which support the arms P.

W' is one of two braces to standard W.

X is the shaft of disks K.

Y is one of the braces connecting pieces S and tongue R.

My frame consists of two main pieces, S, riding on the axle of the rake, which gradually approach each other as they extend forward to the cross-piece V, which joins them at their front ends. The main roller, C', and roller M, over which the usual elevating-apron passes, are journaled in these pieces S.

From a point over the axle on each piece, S, another piece, T, rises and extends forward to the front, where it is joined to and supported on piece S by standard U, and the rollers F are journaled in these two pieces S and T. The pieces S are joined at the front by the cross-piece V. It will be readily seen from this construction that when the aprons D D' D² are in position around rollers C' M F F they form an efficient wind-break to keep the hay from being tossed and tangled by the wind as it is carried up on the aprons. Extending up from each piece S near the axle is a standard, W, which is braced by the piece W', extending out from piece T, forming a support for the swinging arms P.

The operation of my device is as follows: The reach or tongue R is attached to the rear of an ordinary hay-wagon and the horses driven over the hay, which is taken up by the spring-teeth H, as in ordinary raking. As the hay slides up the teeth it comes in contact with the revolving or traveling apron D, and is carried up it to the roller M, where it is dropped onto the wagon. The disks K bear against the hay and form a continuous revolving feed-roller to help feed the hay onto the apron or belts. The arms P, in which the disk-shaft is pivoted, swing loosely at point L, and the disks yield to allow bunches of hay to pass through, and at the same time always bear against the hay in their revolution, keeping it from falling back by their pressure against it, and assist in carrying it up by their revolution. These disks may be either smooth or rough on their perimeters.

An ordinary hay-wagon being only some six feet wide it has been found difficult to load a wagon as fast as desirable by driving the ordinary loader over the hay. To obviate this objection, I have made my rake and loader twice the usual width, arranging a middle apron or reel to pass over two rollers in the usual manner in the center. At each side of this apron I have arranged another apron, which, instead of passing over the parallel roller at the upper end, are given a quarter-twist by passing around the vertical rollers F at the top. By this arrangement about twice as much hay is raked and elevated as in the usual way, which, by means of my condensing-aprons at the side of the main elevating-apron, are carried onto and delivered from the middle apron, D, onto the middle of the wagon.

What I claim is—

1. In a hay rake and loader, the apron D, the twisted belts D' D², for elevating the hay and delivering it onto the wagon, the drums or rollers C' M F F, and the operating-pinion B', and internal cog-circle, B, for actuating the aprons, as and for the purpose set forth.

2. In a spring-tooth hay rake and elevator, the swinging continuous feed-rollers K, which swing between the rake-teeth H and press upon the hay continuously, feeding it onto the aprons D D' D², substantially as shown and described.

3. In a hay rake and loader, the actuating-drum C', rollers M F F, apron D, and the auxiliary twisted or condensing aprons D' D², (having spring-ribs G,) that condense the hay onto apron D, which delivers it onto the wagon, substantially as shown and described.

4. The combination, with the wheels A and cog-circle B, of the pinion B', drum C', rollers M F F, aprons D D' D², rake-teeth H, and hinged feed-rollers or disks K, as and for the purpose set forth.

DAVID B. TANGER.

Witnesses:
CHAS. MCMILLIN,
D. L. SCOTT.